United States Patent
Messih et al.

(10) Patent No.: US 7,826,948 B2
(45) Date of Patent: Nov. 2, 2010

(54) VEHICLE LOADING BASED VEHICLE DYNAMIC AND SAFETY RELATED CHARACTERISTIC ADJUSTING SYSTEM

(75) Inventors: David Messih, Farmington Hills, MI (US); Jianbo Lu, Livonia, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 11/536,105

(22) Filed: Sep. 28, 2006

(65) Prior Publication Data
US 2007/0017727 A1 Jan. 25, 2007

Related U.S. Application Data

(63) Continuation-in-part of application No. 10/966,395, filed on Oct. 15, 2004, now Pat. No. 7,668,645.

(51) Int. Cl.
B60R 21/13 (2006.01)
(52) U.S. Cl. ............... 701/38; 701/45; 340/440; 180/282; 280/5.508; 280/735; 280/6.159
(58) Field of Classification Search ............... 701/1, 701/36, 38, 39, 45, 68, 70, 124, 301, 440; 340/440, 429; 180/282; 280/735, 5.508, 280/734, 5.506, 6.159, 6.16; 177/136; B60R 21/13
See application file for complete search history.

(56) References Cited

U.S. PATENT DOCUMENTS

| | | | |
|---|---|---|---|
| 3,728,538 A | 4/1973 | Bailly | |
| 4,986,609 A | 1/1991 | Cole et al. | |
| 5,884,724 A | 3/1999 | Bohner et al. | |
| 5,939,795 A | 8/1999 | Yu | |
| 6,064,931 A | 5/2000 | Sawada et al. | |
| 6,065,558 A | 5/2000 | Wielenga | |
| 6,131,693 A | 10/2000 | Mukai et al. | |
| 6,304,806 B1 | 10/2001 | Colby et al. | |
| 6,347,271 B1 | 2/2002 | Showalter | |
| 6,401,019 B2 | 6/2002 | Ikemoto | |
| 6,438,464 B1* | 8/2002 | Woywod et al. | 701/1 |
| 6,438,510 B2 | 8/2002 | Zhu et al. | |
| 6,982,635 B2 | 1/2006 | Obradovich | |
| 7,076,353 B2* | 7/2006 | Ogata et al. | 701/45 |
| 7,440,844 B2* | 10/2008 | Barta et al. | 701/124 |
| 7,467,684 B2* | 12/2008 | Wang et al. | 180/282 |
| 2002/0038193 A1* | 3/2002 | Grunberg et al. | 702/173 |
| 2002/0111767 A1* | 8/2002 | Lueschow et al. | 702/175 |
| 2003/0144767 A1 | 7/2003 | Brachert et al. | |
| 2003/0182041 A1* | 9/2003 | Watson | 701/45 |
| 2003/0195667 A1* | 10/2003 | Tange et al. | 701/1 |
| 2004/0041358 A1* | 3/2004 | Hrovat et al. | 280/5.502 |
| 2004/0133338 A1* | 7/2004 | Verhagen et al. | 701/124 |

(Continued)

*Primary Examiner*—Tuan C To
(74) *Attorney, Agent, or Firm*—Angela M Brunetti; Fredrick Owens

(57) ABSTRACT

A method of controlling a controllable chassis system or a safety system (44) for a vehicle (10) includes determining an added mass placed on the vehicle and relative to a known vehicle mass. A vehicle characteristic is adjusted in response to the added mass. A control system (18) for an automotive vehicle (10) includes a sensor (20, 28-42) that generates a signal. A controller (26) determines added mass on the vehicle (10) in response to the signal and adjusts a vehicle characteristic in response to the added mass.

4 Claims, 5 Drawing Sheets

U.S. PATENT DOCUMENTS

2004/0254710 A1* 12/2004 Yano ............................ 701/70
2005/0033549 A1*  2/2005 Clark .......................... 702/150
2005/0114072 A1*  5/2005 Choi ........................... 702/141
2005/0154512 A1*  7/2005 Schubert et al. ................ 701/38
2006/0074530 A1*  4/2006 Meyers et al. .................. 701/1

* cited by examiner

VEHICLE LOADING BASED VEHICLE DYNAMIC AND SAFETY RELATED CHARACTERISTIC ADJUSTING SYSTEM

RELATED APPLICATIONS

The present invention is a continuation-in-part (CIP) application of U.S. patent application Ser. No. 10/966,395, filed on Oct. 15, 2004, and entitled "System and Method for Dynamically Determining Vehicle Loading and Vertical Loading Distance for use in a Vehicle Dynamic Control System", which is incorporated by reference herein.

TECHNICAL FIELD

The present invention relates generally to vehicle control systems and vehicle motion sensing systems. More specifically, it relates to techniques for adjusting ride comfort, handling and safety related characteristics of a vehicle in response to vehicle loading variation and loading distribution variations.

BACKGROUND

Vehicle roll stability control (RSC) schemes are used to address the issue of friction-induced rollovers. RSC systems include a variety of sensors that sense vehicle states and a controller that controls a distributed brake pressure to reduce a tire lateral force such that the net moment of the vehicle is counter to the roll direction.

During an event causing the vehicle to roll, the vehicle body is subject to a roll moment due to the coupling of the lateral tire force and the lateral acceleration applied to the center of gravity of the vehicle body. This roll moment causes suspension height variation, which in turn results in a vehicle relative roll angle (also called chassis roll angle or suspension roll angle). The relative roll angle is an important variable that is used as an input to the activation criteria of RSC and to construct the feedback brake pressure control command. The sum of such a chassis roll angle and the roll angle between wheel axle and the road surface (called wheel departure angle) provides the roll angle between the vehicle body and the average road surface, which is another important variable feeding back to the roll stability control module.

Such a chassis roll angle can be calculated as in U.S. Pat. No. 6,556,908 using the lateral acceleration of the center of gravity of the vehicle body and the roll angular acceleration, together with vehicle parameters such as the sprung mass, the vehicle body roll moment of inertia, the roll stiffness and damping ratio of the suspensions and the anti-roll-bars, and the distance between the center of gravity of the vehicle body and the floor of the vehicle body. The disclosure of U.S. Pat. No. 6,556,908 is hereby incorporated by reference.

One problem with using these parameters in the computation is that the aforementioned relative roll angle may vary with the vehicle operating conditions. For example, a 150 pound roof loading for a typical SUV with a curb weight of 5000 pounds may cause more than 30% error in relative roll angle calculations if computed assuming no roof load. From the vehicle mass point of view, although a 150 pound roof loading accounts for only a 3% mass variation over the vehicle curb weight, it could account for a 30% error in the chassis roll computation, which is ten times larger. If the above parameters are fixed at certain nominal values in the RSC system, it is conceivable that optimal control performance may not be achieved under a different loading condition. For example, if the relative roll angle is computed with nominal vehicle loading condition assumptions, without considering roof loading, the relative roll angle may be under estimated for vehicles with roof loadings, which results in a reduced control. That is, the control system may not be as effective as desired. On the other hand, if the relative roll angle is computed with maximum roof loading, it may be over estimated for vehicles without roof loadings causing unintended control. That is, the control system may become too sensitive or intrusive. Therefore, in order to improve the overall performance of the RSC system, it may be desirable to estimate and update the vehicle parameters periodically or adaptively in real time based on the detected roof loading.

Certain schemes for obtaining vehicle parameters have been disclosed. For example, in U.S. Pat. No. 4,548,079, a method is disclosed for determining vehicle mass directly using engine torque and vehicle acceleration. Similarly, in U.S. Pat. No. 5,490,063, push force is determined from the driveline torque and gear ratio to obtain vehicle mass. In U.S. Pat. No. 6,167,357, instead of calculating vehicle mass directly, a recursive least square (RLS) algorithm is proposed to estimate both vehicle mass and aerodynamic coefficient online. The latter method is considered to be more reliable since it recursively adjusts for estimation error of the previous estimates. Furthermore, the use of vehicle acceleration, which is usually very noisy, is avoided. The mass estimation schemes proposed in the above-cited patents may not accurately indicate changes to parameters that impact the roll dynamics of the vehicle. For example, a 150 pound roof loading on a 5000 pound SUV, i.e., 3% mass change, might be undetectable in the above schemes due to the potential error in the engine torque, which usually is much larger than 3%. Other error sources include the tire rolling radius change due to tire pressure drop and due to the vehicle loading variations, the vehicle drag and the offset or uncertainty in the longitudinal accelerometer.

The above schemes focus mainly on large mass variations, which may have significant influences on the vehicle longitudinal dynamics and vehicle fuel consumption. They do not differentiate when the vehicle mass change is due to a floor loading or due to a roof loading. However, the roof loading causes much more significant roll motion parameter changes than does the same amount of floor loading. That is, there is a need to detect not only the amount of loading (maybe much smaller than that can be detected by the existing method), but also the location of the loading (the vertical and longitudinal distance of the loading with respect to the vehicle floor or the center of gravity of the vehicle body, for example).

Furthermore, the other parameters that affect vehicle body roll and lateral dynamics, such as the roll stiffness and damping in the suspensions and the total center of gravity height of the vehicle body with respect to the vehicle floor, the roll moment of inertia, should also be taken into account.

With the advance in electronic controls, currently, some actuators designed for vehicle's ride and handling performances are now finding their ways to be utilized for stability control and safety. For example, suspension controls might be used for achieving certain yaw stability control function through individual suspension controls. The same is true for the actuators designed for stability control are utilized for vehicle's comfort and ride handling performances. For example, the selective braking and engine torque reduction used in stability control might be utilized for adjusting the vehicle's response during non-stability event such that the driver is experiencing a smooth and less intrusive driving. As another example, the control suspensions to achieve the vehicle's ride comfort and handling performance usually adjust only the suspension parameters to counteract these road disturbances such as gravel and potholes and they are not necessarily designed to account for vehicle loading, which, as stated above, can affect vehicle response too.

Therefore, there is a need for a technique that can detect or adaptively update the vehicle parameters, including vehicle loading and loading location, the roll moment of inertia, in order to refine and improve a vehicle control system relating to both the stability control functions including roll stability control function during vehicle stability control events and the ride comfort and handling functions during normal driving events.

SUMMARY OF THE INVENTION

It is one object of an embodiment of the invention to provide a system for a quantitative characterization of the chassis roll that may be used in conjunction with the stability control system of a vehicle to determine accurate vehicle roll trending for vehicles with varying inertia parameters due to loading conditions, and adaptively adjust the computation of the chassis roll angle and/or adaptively adjust the activation criteria for the stability control function. More specifically, the present invention seeks to determine the roll condition in response to an additional mass and/or height of the mass, that is, to determine if a small mass change may significantly impact the roll dynamics of the vehicle, as is the case of a roof load. The control system then can make a determination with respect to adjusting vehicle control command. In one embodiment, the sensitivity and profile of the control commands of various actuators and/or the response thereof are adjusted.

In another embodiment, a method of controlling a vehicle dynamics includes determining an added mass placed on the vehicle and relative to a known vehicle mass. A vehicle characteristic, such as the ride, comfort and handling, is adjusted in response to the added mass.

In a further embodiment, a control system for an automotive vehicle includes a sensor that generates a signal. A controller determines the added mass on the vehicle in response to the signal and adjusts at least one vehicle characteristic in response to the added mass.

In yet another embodiment of the invention, a method of controlling a vehicle is provided and includes determining a roll gradient, a roll acceleration coefficient, and/or a roll rate coefficient. That is, the roll acceleration coefficient, roll gradient and the roll rate coefficient may be used simultaneously or in various combinations to control the vehicle dynamics.

In still another embodiment of the invention, a method of controlling a control device for a vehicle is provided that includes determining a composite parameter called roll gradient, determining another composite parameter called roll acceleration coefficient, determining an added mass and a height of the added mass from the roll gradient and the roll acceleration coefficient, and controlling the control system in response to the added mass and height.

In another embodiment of the invention, a control system for an automotive vehicle is provided and includes a roll rate sensor generating a roll rate signal, a lateral acceleration sensor generating a lateral acceleration signal, a longitudinal acceleration sensor generating a longitudinal acceleration signal, and a yaw rate sensor generating a yaw rate signal. The control system and the sensors are coupled to a controller. The controller determines an added mass and a height of the added mass from the roll rate, the lateral acceleration, the longitudinal acceleration and the yaw rate and controlling the control system in response to the added mass and height.

In another embodiment of the invention, a method of controlling a control device for a vehicle is provided and includes determining different roll conditions differentiated through determining an added mass and a height of the added mass, and controlling the control system in response to the roll condition due to an aggressive driving maneuver and enhanced by the added mass at the given height.

One advantage of the invention is that various vehicle loading conditions can be detected and determined very accurately. Such loading conditions (for example, roof loadings) are usually a fraction of the total vehicle mass (for example, 3% to 6% of the vehicle curb weight), are difficult to be detected by using the methods involving longitudinal vehicle dynamics, and may cause large (for example, more than 30%) changes in the chassis roll angle.

Another advantage of the present invention is that it may be utilized alone or in conjunction with or as part of various vehicle control systems to improve vehicle ride, handling and safety performances for various normal and abnormal driving conditions.

Other advantages and features of the present invention will become apparent when viewed in light of the detailed description when taken in conjunction with the attached drawings and appended claims.

DETAILED DESCRIPTION

Figure 1:
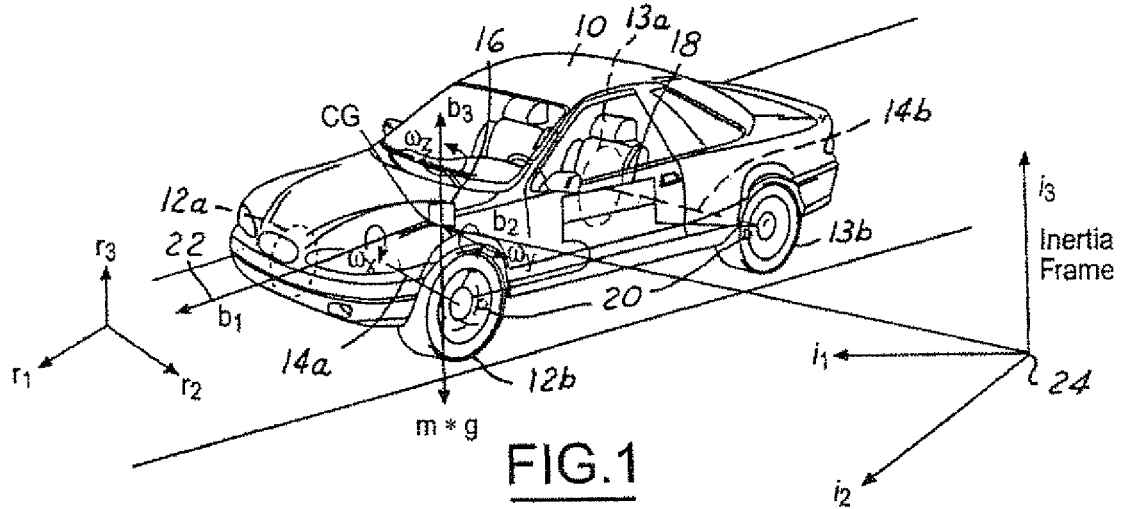
FIG. 1 is a diagrammatic view of a vehicle with variable vectors and coordinate frames according to the present invention.

In the following figures, the same reference numerals will be used to identify the same components. The present invention may be used in conjunction with a roll stability control system for a vehicle. The present invention may also be used with the other chassis control system such as a controllable suspension system, a controllable steering system, an active roll bar. The present invention will be discussed below in terms of several embodiments relating to an automotive vehicle moving in a three-dimensional road terrain. Some embodiments of the present invention are described with respect to determining an added mass and height of the mass. As will be described below the added mass and height may not be directly determined, rather by adaptively updating a roll gradient value, roll acceleration coefficient, roll moment of inertia and/or a roll rate coefficient, the effects of added mass and the height may be included in those values. Such values may also be referred to as an "adaptive" roll gradient, an "adaptive" roll acceleration coefficient, an "adaptive" roll moment of inertia and an "adaptive" roll rate coefficient. The various roll parameters may be referred to as adaptively determined, meaning that such values may change due to a changing mass or load over time. That is, such values are not fixed as has been done in previous systems.

It should also be noted that while one of the roll gradient, roll acceleration coefficient and roll rate coefficient may be adaptively determined, the other two values may not be adaptive.

Referring to FIG. 1, an automotive vehicle 10 with a safety system of the present invention is illustrated with the various forces and moments thereon during a rollover condition. Vehicle 10 has front right (FR) and front left (FL) wheel/tires 12A and 12B and rear right (RR) wheel/tires 13A and rear left (EL) wheel/tires 13B, respectively. The vehicle 10 may also have a number of different types of front steering systems 14a and rear steering systems 14b, including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. The front and rear wheel steering systems 14a and 14b may be or be part of an electronic power steering (EPS) or an active steering system. Generally, the vehicle has a weight represented as Mg at the center of gravity of the vehicle, where g=9.8 m/s² and M is the total mass of the vehicle.

As mentioned above, the system may also be used with chassis control systems and safety systems including active/semi-active suspension systems, anti-roll bar, or airbags or other safety devices deployed or activated upon sensing predetermined dynamic and safety conditions of the vehicle.

The sensing system 16 is coupled to a control system 18. The sensing system 16 may comprise many different sensors including the sensor set typically found in a roll stability control including lateral accelerometer, yaw rate sensor, steering angle sensor and wheel speed sensor which are equipped for a traditional yaw stability control system together with a roll rate sensor and a longitudinal accelerometer. The various sensors will be further described below. The sensors may also be used by the control system in various determinations such as to determine a lifting event, determine a height and position of a mass, etc. The wheel speed sensors 20 are mounted at each corner of the vehicle and generate signals corresponding to the rotational speed of each wheel. The rest of the sensors of sensing system 16 may be mounted directly on the center of gravity of the vehicle body, along the directions x, y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. Calculations may take place in an inertial frame 24 that may be derived from the body frame 22 as described below.

The angular rate sensors and the accelerometers may be mounted on the vehicle car body along the body frame directions $b_1$, $b_2$ and $b_3$ which are the x-y-z axes of the sprung mass of the vehicle.

The longitudinal acceleration sensor is mounted on the car body located at the center of gravity, with its sensing direction along $b_1$ axis, whose output is denoted as $a_x$. The lateral acceleration sensor is mounted on the car body located at the center of gravity, with its sensing direction along $b_2$ axis, whose output is denoted as $a_y$.

The other frame used in the following discussion includes the road frame, as depicted in FIG. 1. The road frame system $r_1 r_2 r_3$ is fixed on the driven road surface (which is yawing and translating with the vehicle), where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xbr}$ and $\theta_{ybr}$, which are also called the relative Euler angles (i.e., relative roll and relative pitch angles, respectively).

Figure 2:
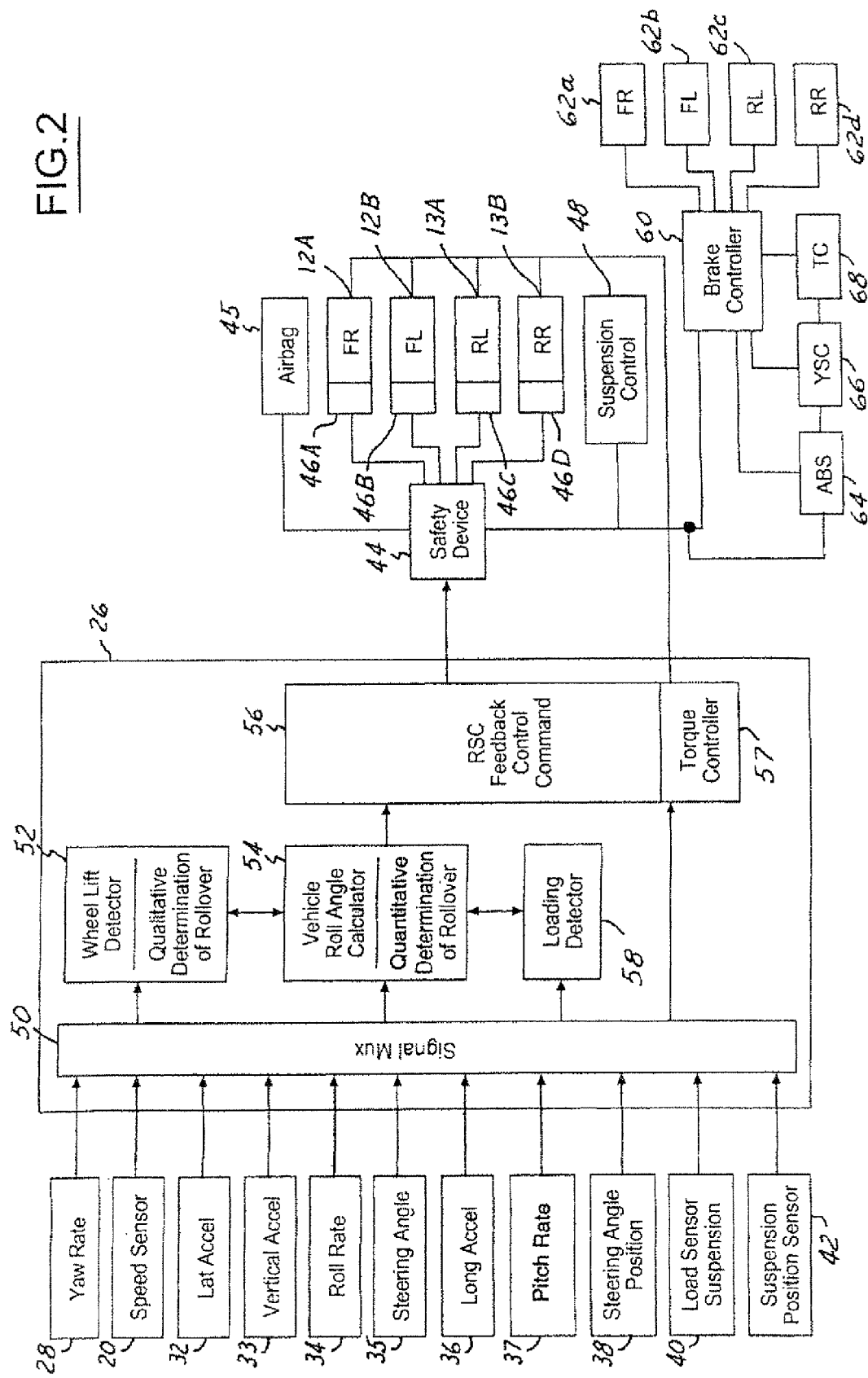
FIG. 2 is a block diagram of a stability system according to the present invention.

Referring now to FIG. 2, roll stability control system 18 is illustrated in further detail having a controller 26 used for receiving information from a number of sensors which may include a yaw rate sensor 28, a speed sensor 20, a lateral acceleration sensor 32, a vertical accelerometer sensor 33, a roll angular rate sensor 34, a steering wheel (hand wheel) angle sensor 35, a longitudinal acceleration sensor 36, a pitch rate sensor 37, steering angle (of the wheels or actuator) position sensor 38, suspension load sensor 40 and suspension position sensor 42. It should be noted that various combinations and sub-combinations of the sensors may be used.

Controller 26 may include a signal multiplexer 50 that is used to receive the signals from the sensors 28-42. The signal multiplexer 50 provides the signals to a wheel lift detector 52, a vehicle roll angle calculator 54, and to a roll stability control (RSC) feedback control command 56. Also, wheel lift detector 52 may be coupled to the vehicle roll angle calculator 54. The vehicle roll angle calculator 54 may also be coupled to the RSC feedback command 56. The RSC feedback command 56 may include a torque controller 57. Vehicle roll angle calculator 54 is described in U.S. Provisional Application Ser. Nos. 60/400,376 and 60/400,172, and in U.S. patent application Ser. No. 10/459,697, the disclosures of which are incorporated herein by reference.

A loading detector 58 may also be included in controller 26. The loading detector 58 may be used to determine an additional mass of the vehicle and a distance of the mass as will be described below.

In one embodiment, the sensors are located at the center of gravity of the vehicle. Those skilled in the art will recognize that the sensor may also be located off the center of gravity and translated equivalently thereto.

Safety device 44 may control the position of the front right wheel actuator 46A, the front left wheel actuator 46B, the rear left wheel actuator 46C, and the right rear wheel actuator 46D. Although as described above, two or more of the actuators may be simultaneously controlled. For example, in a rack-and-pinion system, the two wheels coupled thereto are simultaneously controlled. Based on the inputs from sensors 28 through 42, controller 26 determines a roll condition and/or wheel lift and controls the steering position and/or braking of the wheels.

Safety device 44 may be coupled to a brake controller 60. Brake controller 60 controls the amount of brake torque at a front right brake 62a, front left brake 62b, rear left brake 62c and a rear right brake 62d. Other safety systems such as an antilock brake system 64, a yaw stability control system 66 and a traction control system 68 may also benefit from the knowledge of the additional mass and position of the mass detected by the loading detector 58. This information may be used to modify the control strategy used in computing the controlled brake force.

Speed sensor 20 may be one of a variety of speed sensors known to those skilled in the art. For example, a suitable speed sensor may include a sensor at every wheel that is averaged by controller 26. The controller may translate the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Load sensor 40 may be a load cell coupled to one or more suspension components. By measuring the stress, strain or weight on the load sensor a shifting of the load can be determined.

The center of gravity C is illustrated with nominal mass M. A roll axis is also illustrated at a distance D from the center of gravity $a_y$ is the lateral acceleration.

Figure 3:
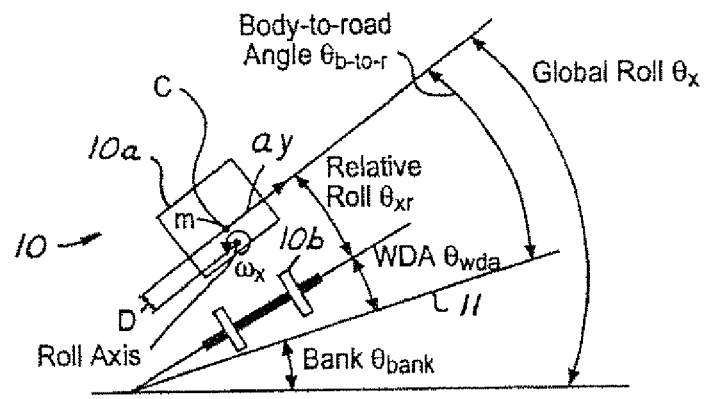
FIG. 3 is a front view of an automotive vehicle illustrating various angles according to the present invention.

Referring now to FIG. 3, the relationship of the various angles of the vehicle 10 relative to the road surface 11 is illustrated. In the following, a reference road bank angle $\theta_{bank}$ is shown relative to the vehicle 10 on a road surface. The vehicle has a vehicle body 10a and wheel axle 10b. The wheel departure angle $\theta_{wda}$ is the angle between the wheel axle and the road. The relative roll angle $\theta_{xr}$ is the angle between the wheel axle 10b and the body 10a. The global roll angle $\theta_x$ is the angle between the horizontal plane (e.g., at sea level) and the vehicle body 10a.

Another angle of importance is the linear bank angle. The linear bank angle is a bank angle that is calculated more frequently (perhaps in every loop) by subtracting the relative roll angle generated from a linear roll dynamics of a vehicle (see U.S. Pat. No. 6,556,908 which is incorporated by reference herein), from the calculated global roll angle (as in U.S. Pat. No. 6,631,317 which is incorporated by reference herein). If all things were slowly changing without drifts, errors or the like, the linear bank angle and reference road bank angle terms would be equivalent.

Figure 4:
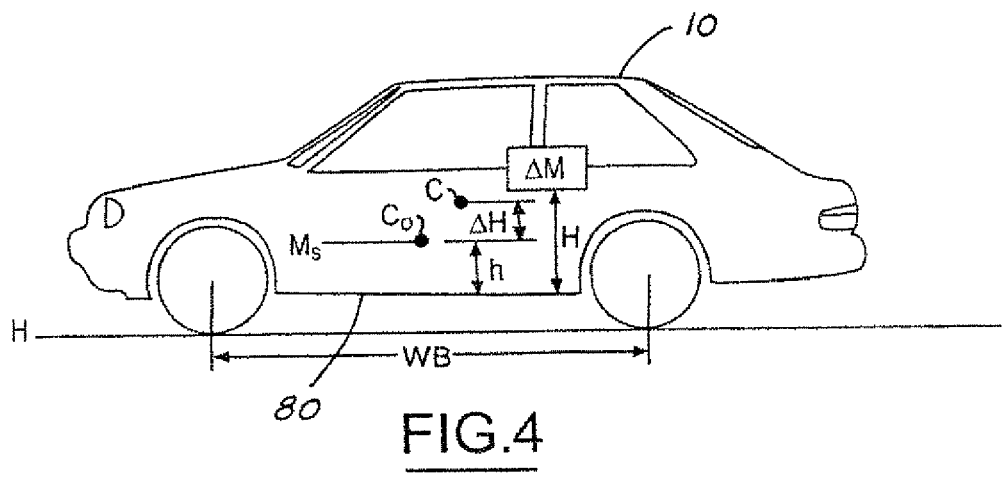
FIG. 4 is a side view of an automotive vehicle illustrating various variables thereon.
Figure 5:
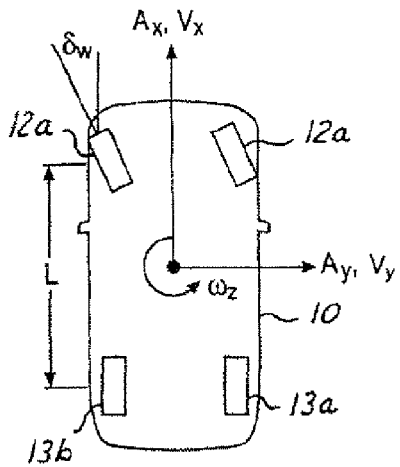
FIG. 5 is a top view of an automotive vehicle having variables used in the following calculations thereon.

Referring now to FIGS. 4 and 5, an automotive vehicle 10 is illustrated with various parameters illustrated thereon. A change in mass $\Delta M$ is illustrated relative to nominal center of gravity $C_0$. The center of gravity moves to C and the added mass $\Delta M$ is added thereto. The change in mass or load $\Delta M$ is positioned at a distance H above the load floor 80. The nominal center of gravity $C_0$ is located at position h above the load floor 80. The distance between the new center of gravity and the nominal center of gravity $C_0$ is $\Delta H$.

The longitudinal acceleration is denoted by $a_x$ whereas the longitudinal velocity is denoted $v_x$. The lateral acceleration and lateral velocity is denoted by $a_y$ and $v_y$ respectively. The steering wheel angle is denoted by $\delta_w$. The wheelbase of the vehicle is denoted by the symbol WB.

Figure 6:
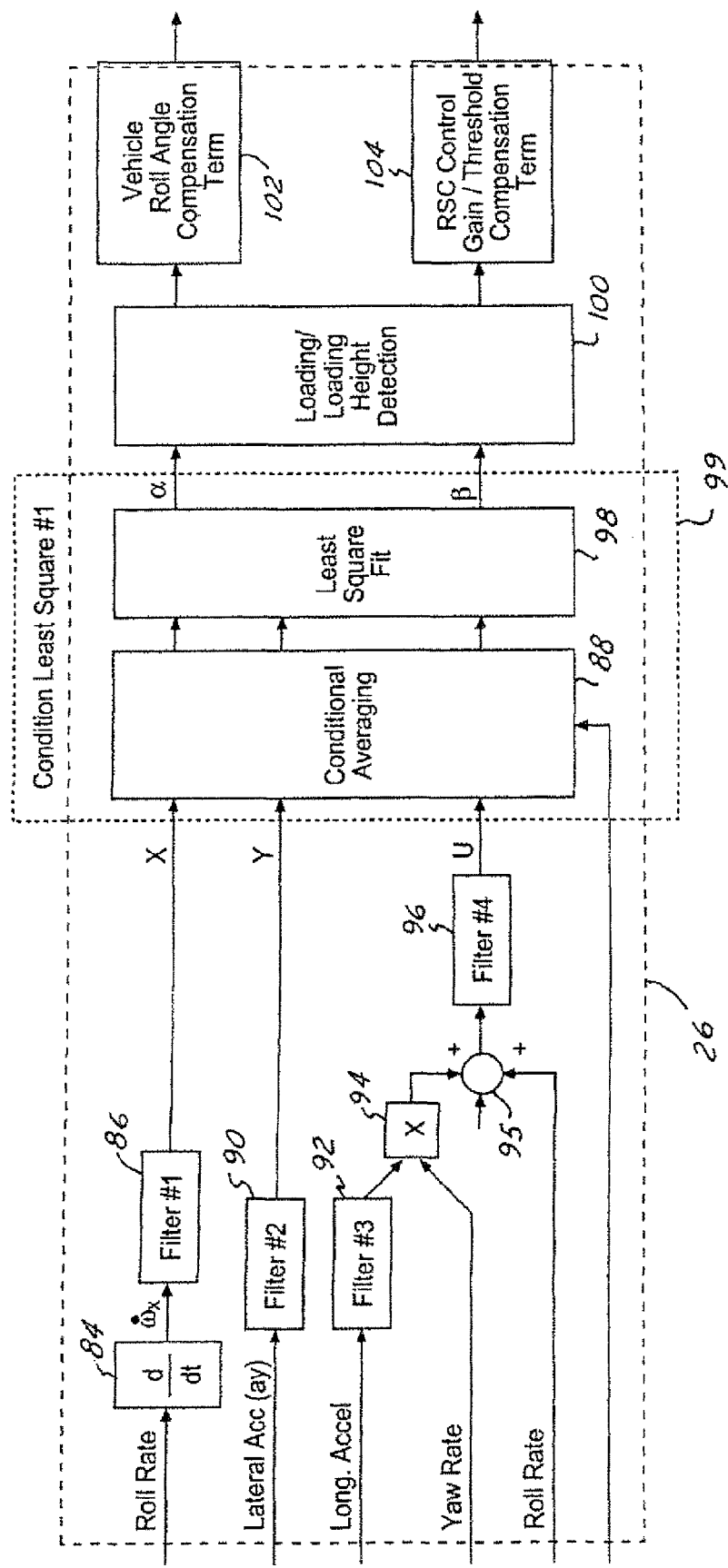
FIG. 6 is a block diagrammatic view of a controller according to a first embodiment of a least square method of the present invention.

Referring now to FIG. 6, controller 26 is illustrated in further detail. Controller 26 receives various sensor signals, for example, the roll rate, the lateral acceleration, the longitudinal acceleration and the yaw rate from the respective sensors. From the sensor signals, the loading height and amount of loading, the roll gradient, roll rate parameter, roll acceleration coefficient and roll inertia may be determined. These terms may be used to generate a vehicle roll angle compensation term and a roll stability control gain/threshold compensation term. Instead of determining the load and height of the load, an adaptive roll acceleration coefficient and an adaptive roll gradient that inherently have the load and height of the load therein may be determined. As mentioned above, these values in prior systems were fixed without regard to loading. Here they are adaptively determined to correspond to the loading condition. For example, these terms may increase the sensitivity of the system due to a higher center of mass. As will be further described below, the controller uses the roll rate signal and performs a derivative in box 84 to generate the roll acceleration signal $\dot{\omega}_x$, which is then filtered by the first filter 86 to generate the variable X, which is provided to a conditionality averaging box 88. The lateral acceleration signal is filtered in the second filter 90 and provided to the conditionality averaging box 88 illustrated as Y. The longitudinal acceleration is filtered in the third filter number 92 and provided to conditionality averaging box 88. As will be further described below, the conditional averaging box generates signals that are coupled to a least squares fit determination 98 which provides variables $\alpha$ and $\beta$. The $\alpha$ and $\beta$ variables are provided to a loading/loading height detection block 100. The conditional averaging block and least squares fit block 98 illustrate a first conditional least square method illustrated by box 99. The loading/loading height detection block 100 generates a vehicle roll angle compensation term 102 and an RSC control gain/threshold compensation term 104.

Figure 7:
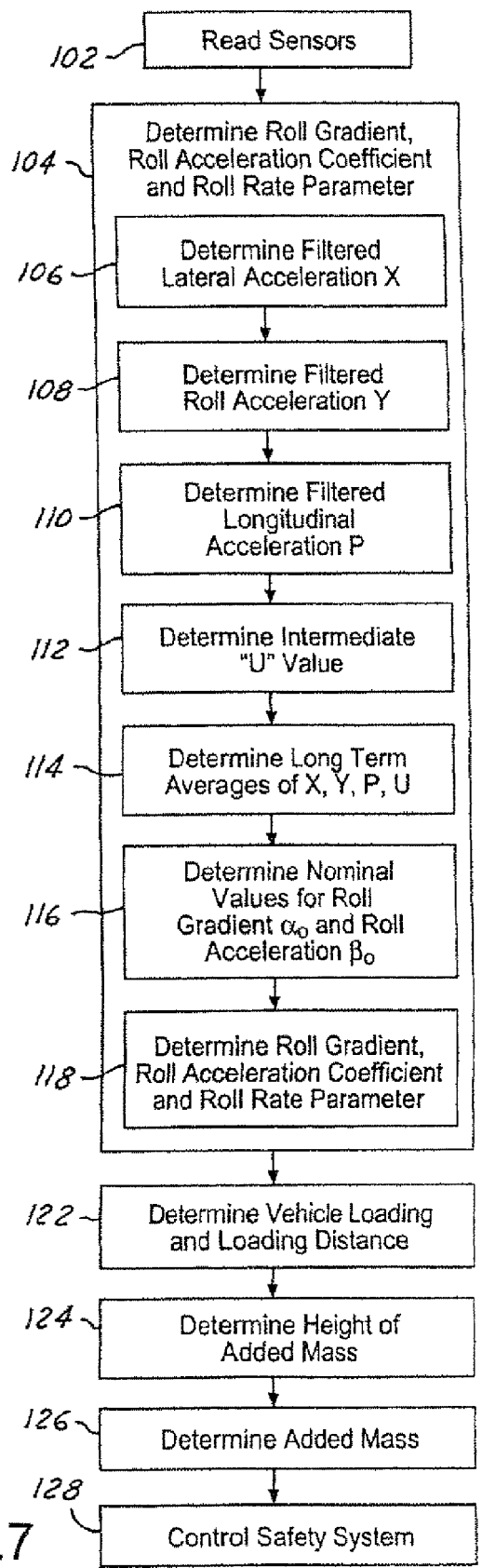
FIG. 7 is a logic flow diagram illustrating a method of operating a safety system in accordance with multiple embodiments of the present invention.

Referring now to FIG. 7, the operation of the controller 26 is described in further detail. In step 102, the various sensors such as the roll rate sensor, the lateral acceleration sensor, longitudinal acceleration sensor and yaw rate sensor are read.

The roll signal for control is calculated as the $(\theta_x - \theta_{refbank})$, i.e., the subtraction of the reference bank angle from the global roll angle. The roll signal for control may be used to control the roll stability control system or other system or device.

As mentioned above, the various errors not limited to sensor signal drift (for example, due to environmental temperature variations), zero offset, sensor signal scaling factor (sensor signal sensitivity) nonlinearity, and numerical errors in computation, may enter into the various computations at various times Thus, in certain situations the wheel departure angle or the reference bank angle may not be accurate. The following description describes how these values can be updated in response to wheel lift/wheel grounded values.

In step 104, the roll gradient, roll acceleration coefficient computation and a roll rate parameter are determined. In the following discussion, the roll gradient, the roll acceleration coefficient and the roll rate parameter are defined and then computed based on the measured signals and the computed signals.

There are two roll angle computations in the roll stability control: one is the relative roll angle as computed in U.S. Pat. No. 6,556,908 and the other is the global roll angle computation as computed in U.S. Pat. No. 6,631,317. U.S. Pat. Nos. 6,556,9087 and 6,631,317 are incorporated by reference herein. The relative roll angle is a function of the lateral acceleration $a_y$, the roll acceleration $\dot{\omega}_x$, the roll rate $\omega_x$, the roll gradient $\alpha$ and the roll acceleration coefficient $\beta$ and a roll rate coefficient $\eta$. That is, $$\theta_{xy} = f(a_y, \dot{\omega}_x; \alpha, \beta, \eta, \omega_x) \tag{1}$$

In z-transformation, $$\theta_{XY} = \alpha T_{roll}(z) a_y - \beta T_{roll}(z) \dot{\omega}_x \tag{2}$$

where $T_{roll}(z)$ is a filter which reflects the linear roll model of the vehicle, i.e., it includes the roll stiffness and damping effect due to suspension dynamics. Based on the roll dynamics, the following is true:

$$\theta_{xr} + \frac{D_{roll}}{K_{roll}}\dot{\theta}_{xr} = \alpha a_y + \beta\dot{\omega}_x$$

Performing a Laplace transform to convert this equation into the frequency domain equation, leads to the following computation $\theta_{xr}(s)=T_{Roll}(s((\alpha a_y(s)+\beta\dot{\omega}_x(s)))$ where the transfer function $T_{Roll}$ is $$T_{Roll}(s) = \frac{1}{1+\eta s}$$

with the roll rate coefficient $\eta$ is defined as $$\eta = \frac{D_{roll}}{K_{roll}}$$

Using the algorithm shown in U.S. Pat. No. 6,631,317, the global roll angle $\theta_x$ (the roll angle of the vehicle body with respect to sea level) can be obtained through an anti-drift integration of the Euler roll angle velocity (which is different from the roll angular rate) and a roll reference signal through a steady-state recovery filter. On level ground when the vehicle does not have wheels in the air, such a calculated global roll angle is the same as the chassis roll angle when the vehicle roll dynamics is within its linear range (for example, the cornering acceleration of the vehicle is under 0.35 g).

Therefore, on level ground when the vehicle does not have wheels in the air and the vehicle has moderate cornering acceleration, the algorithm used to compute global roll angle as in U.S. Pat. No. 6,631,317 is a function of the roll rate $\omega_x$, the yaw rate $\omega_z$, the relative roll angle $\theta_{xr}$ and the relative pitch angle $\theta_{yr}$ $$\theta_x = g(\omega_y,\omega_z,\theta_{xr},\theta_{yr}) \quad (3)$$

In z-transformation, such a computation can be expressed as in the following format $$\theta_x = T_{adi}(z)[\omega_x+\omega_z\theta_{yr}]+T_{ssc}(z)\theta_{xr} \quad (4)$$

where $T_{adi}(z)$ is the so-called steady-state recovery filter, which is used to recover the good low frequency portion of the roll angle removed by the anti-drift-integration filter. Here the relative roll angle (chassis roll angle) $\theta_{xr}$ is used to recover the true steady state value of the roll angle.

Notice that on level ground if the vehicle is driven without wheel lifting and with moderate cornering acceleration, the relative roll angle and the global roll angle are equal. Therefore, from equations (1) and (3) or (2) and (4), the relationships between the roll gradient $\alpha$, the roll acceleration coefficient $\beta$, and the roll rate coefficient $\eta$ may be found.

Although the computation of the roll gradient $\alpha$ and the roll acceleration coefficient $\beta$ is the main focus of this disclosure, the roll rate coefficient $\eta$ can be similarly determined. It can be adaptively determined independent of the determination $\alpha$ and $\beta$, or simultaneously determined together with $\alpha$ and $\beta$. Likewise $\alpha$ and $\beta$ can be independently determined.

Substituting (2) into (4), the following is obtained $$\theta_x = T_{adi}(z)[\omega_x+\omega_z\theta_{yr}]+\alpha T_{ssc}(z)T_{roll}(z)a_y-\beta T_{ssc}(z)T_{roll}(z)\dot{\omega}_x \quad (5)$$

where the relative pitch $\theta_{yr}$ is a function of the longitudinal acceleration and the pitch acceleration as in the following (see U.S. Pat. No. 6,556,908 for detail)

$$\theta_{yr} = m(a_x,\dot{\omega}_y;\kappa,\lambda) \quad (6)$$

and which can be further written as $$\theta_{yr} = \kappa T_{pitch}(z)a_x+\lambda T_{pitch}(z)\dot{\omega}_y \quad (7)$$

where $T_{pitch}(z)$ is a filter which reflects the linear pitch model of the vehicle, i.e., it includes the pitch stiffness and damping effect due to the vehicle suspension dynamics. $T_{pitch}(z)$ is different for vehicle deceleration and acceleration, i.e., $$T_{pitch}(z) = \begin{cases} T_{pitchacc}(z) & \text{if } a_x > 0 \\ T_{pitchdec}(z) & \text{if } a_x \le 0 \end{cases} \quad (8)$$

and the same is true for the pitch gradient $\kappa$ and the pitch acceleration coefficient $\lambda$ $$\kappa = \begin{cases} \kappa_{acc} & \text{if } a_x > 0 \\ \kappa_{dec} & \text{if } a_x \le 0 \end{cases} \quad (9)$$

$$\lambda = \begin{cases} \lambda_{acc} & \text{if } a_x > 0 \\ \lambda_{dec} & \text{if } a_x \le 0 \end{cases}$$

If the pitch angular rate $\omega_y$ is not available, the above relative pitch $\theta_{yr}$ can be approximated as in the following $$\theta_{yr} \approx \kappa T_{pitch}(z)a_x \quad (10)$$

which is acceptably accurate at low frequency region (pitch acceleration term only provides high frequency contents).

By equating (2) and (5) on level ground, $\theta_x=\theta_{xr}$, the following equation is obtained $$\alpha X-\beta Y=U \quad (11)$$

where $X=T_{roll}(z)(1-T_{ssc}(z))a_y$ $Y=T_{roll}(z)(1-T_{ssc}(z))\dot{\omega}_x$ $$U=T_{adi}(z)[\omega_x+\omega_z\theta_{yr}] \quad (12)$$

The following is a summary of the computation algorithm.

In step 106, the filtered lateral acceleration X is determined in the following iterative equation $$X_k=d_{11}X_{k-1}+d_{12}X_{k-2}+d_{13}X_{k-3}+n_{11}a_{y_k}+n_{12}a_{y_{k-1}}+n_{13}a_{y_{k-2}}+n_{14}a_{y_{k-1}} \quad (13)$$

where $d_{1i}$, $n_{1i}$ for i=1, 2, 3, 4 are the involved first set of the filter coefficients.

In step 108, the filtered roll acceleration Y as is determined in the following iterative equation $$Y=d_{11}Y_{k-1}+d_{12}Y_{k-2}+d_{13}Y_{k-3}+n_{11}\dot{\omega}_{x_k}+n_{12}\dot{\omega}_{x_{k-1}}+n_{13}\dot{\omega}_{x_{k-2}}+n_{14}\dot{\omega}_{x_{k-3}} \quad (14)$$

In step 110 the filtered roll angle velocity, which is the sum of the roll rate and the product of the relative pitch and yaw rate, may be calculated in the following iterative algorithm $$U=d_{21}U_{k-1}+d_{22}U_{k-2}+d_{23}U_{k-3}+n_{21}R_k+n_{22}R_{k-1}+n_{23}R_{k-2}+n_{24}R_{k-3} \quad (15)$$

where $R_k$ is the total roll angle velocity at the kth time instant on level ground, i.e., $$R_k = \omega_{x_k} + \omega_{z_k}\theta_{yr_k} \quad (16)$$

where $d_{2i}, n_{2i}$ for $i=1, 2, 3, 4$ are the involved $2^{nd}$ set of the filter coefficients. If the approximation (10) is used, the total roll velocity on level ground can be approximated as in the following $$R_k \approx \omega_{x_k} + \kappa\omega_{z_k}T_{pitch}(z)(a_{x_k}) \quad (17)$$

Using the calculated filtered value $X_k$, $Y_k$ and $U_k$ at each sampling instant k, equation (11) can be used to potentially compute the unknown parameters of the roll gradient $\alpha$, the roll acceleration coefficient $\beta$ if the roll rate coefficient $\eta$ is determined independent of the determination of $\alpha$ and by $\beta$. A more complicated method is needed in order to obtain $\alpha$, $\beta$ and $\eta$ simultaneously. One method to compute the unknown values $\alpha$ and $\beta$ in equation (11) is the so-called least-square method.

Since equation (11) is true when the vehicle is driven on level ground and the vehicle does not have any wheel in the air (4 tires are contacting the road), a conditional least-square (CLS) method is used. Two CLS's may be used. The first CLS method conduct $\alpha$ and $\beta$ parameter updating after a fixed number of conditional samples, while the second method updates $\alpha$ and $\beta$ and resets a covariance matrix at each conditional sample.

Figure 6A:
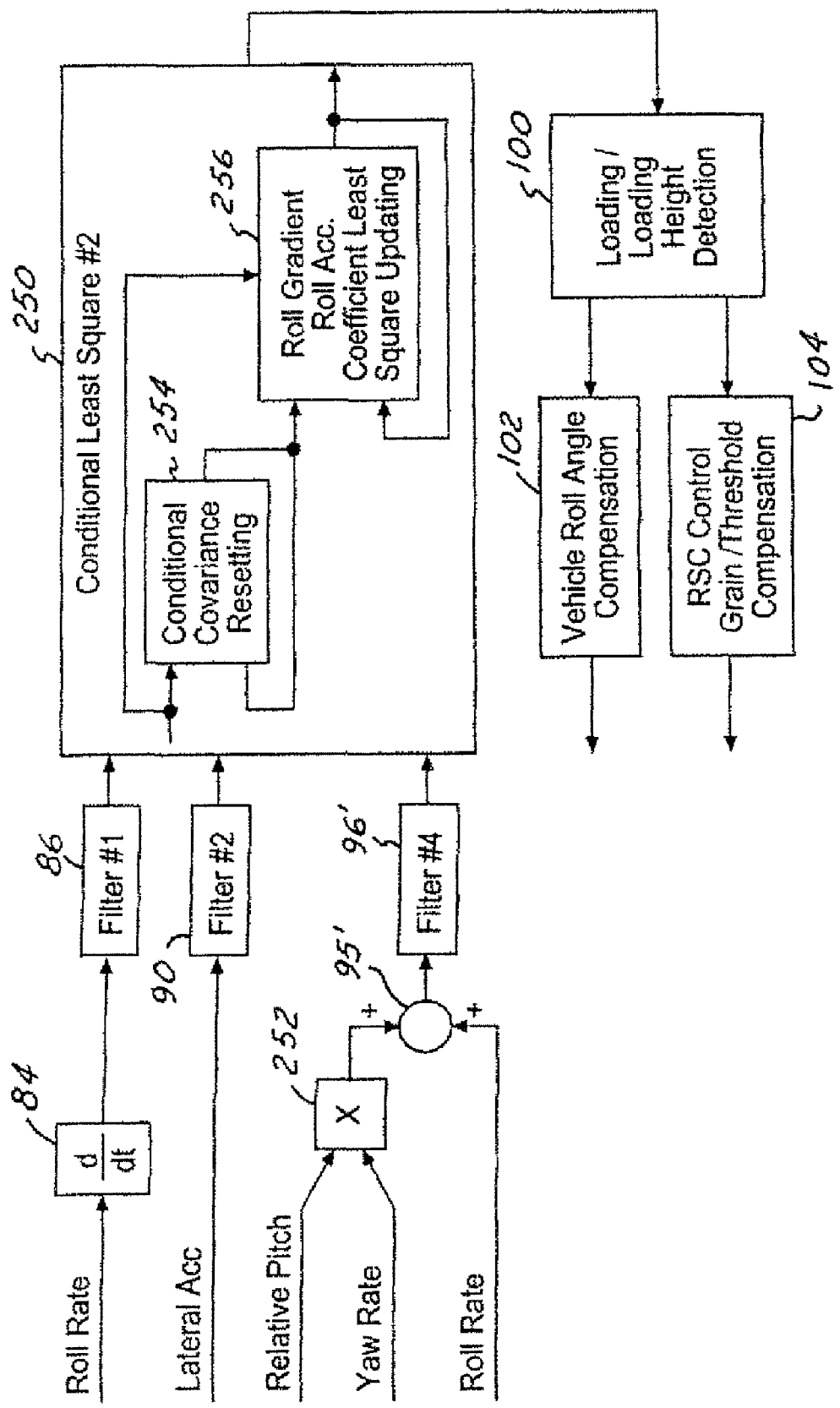
FIG. 6A is a block diagrammatic view of a controller according to a second embodiment of a least square method of the present invention.

Referring to FIG. 6A, the second conditional least square method is illustrated by box 250. Blocks 84, 86, 90 are the same as in FIG. 6. This embodiment, however, uses a relative pitch signal instead of the longitudinal acceleration signal. The relative pitch signal and yaw rate signal are multiplied in block 252. The output of block 252 is added to the roll rate in addition to block 95' and filtered in block 96'. The filtered signals from blocks 86, 90, 96' are provided to a conditional covariance block 254. The block 254 output is provided to roll gradient, roll acceleration coefficient least square updating block 256, which provides an output to block 100.

Since $\alpha$ and $\beta$ are related to the inertia parameters of the vehicle body roll motion, only if the vehicle roll mode is fully excited $\alpha$ and $\beta$ can be identified correctly through least-square methods. Hence, under the steady-state driving condition, the least-square identification is not conducted. Therefore, a further condition reflecting vehicle roll dynamic condition is needed. Considering the driver's steering input could induce roll dynamics, one of such conditions can be characterized using the steering wheel angle velocity, i.e., only if $$|\dot{\delta}_w| \geq \delta_{wvmin}$$

the CLS method will be conducted, $\delta_w$ is the measured steering wheel angle, $\delta_{wvmin}$ is a threshold (for example, 20 degree per second).

In step 114, the conditional sum of the products or cross products of the above filtered variables are determined over a significant large number N of the conditional samples. This is performed using the following iterative algorithm if the first CLS method is used if { $|\dot{\delta}_w| \geq \delta_{wvmin}$ & level ground
& no wheel lifting
& $s \leq N$ )
{
$a_{11_{s+1}} = a_{11_s} + X_k^2$ -continued $a_{21_{s+1}} = a_{21_s} - X_k Y_k$
$a_{22_{s+1}} = a_{22_s} + Y_k^2$
$b_{1_{s+1}} = b_{1_s} + X_k U_k$
$b_{2_{s+1}} = b_{2_s} - Y_k U_k$
$s = s + 1$
} (18)

Notice that the time instant denoted by k is different from the CLS updating instant denoted by s. Only if the conditions are satisfied all the time, then s=k. N in (18) is the total number of conditional samples used for CLS, which could have value ranged from 1000 to 80,000.

Step 114 is performed for the conditional sample when the road is a level ground. The level ground can be identified if there is an indication that the vehicle is not on a significantly banked road. Therefore, checking road bank can be used for this purpose, for example, using the method disclosed in U.S. Pat. No. 6,718,248. The level ground can also be checked through a flatness index (as the one calculated in U.S. Pat. No. 6,718,248), or a road profile detection (see U.S. Pat. No. 6,718,248), or a rough comparison between the global roll angle and the nominal chassis roll angle.

In step 116, the nominal values for $\alpha_0$ and $\beta_0$ of the roll gradient and roll acceleration coefficient are calculated. They can also be obtained by using test data from the vehicle with nominal loading condition and nominal configuration.

In step 118, the roll gradient a and the roll acceleration coefficient $\beta$ are computed as in the following if $s = N$
{

$$D = \min\left(\max\left(a_{11_N} - \frac{a_{21_N}^2}{\max(a_{22_N}, a_{min})}, -a_{min}\right), a_{min}\right);$$

$$\alpha = \min\left(\max\left(\left(b_{1_N} - \frac{a_{21_N}b_{2_N}}{\max(a_{22_N}, a_{min})}\right)D^{-1}, \underline{\alpha}\right), \overline{\alpha}\right);$$

$$\beta = \min\left(\max\left(\left(\frac{a_{11_N}b_{2_N}}{\max(a_{22_N}, a_{min})} - \frac{a_{21_N}b_{1_N}}{\max(a_{22_N}, a_{min})}\right)D^{-1}, \underline{\beta}\right), \overline{\beta}\right);$$

$s = 0;$ $a_{11_s} = 0; \quad a_{21_s} = 0; \quad a_{22_s} = 0;$ $b_{1_s} = 0; \quad b_{2_s} = 0;$

} where $a_{min}$ is a small number (for example, 0.0001), which is used to remove division by zero in the implemented computation; $\underline{\alpha}$ and $\overline{\alpha}$ are the respective lower and upper bounds of the roll gradient, which can be calculated as $\underline{\alpha} = \alpha_0 - \Delta\alpha$ $\overline{\alpha} = \alpha_0 + \Delta\alpha$ (20)

and $\alpha_0$ is the nominal value of the roll gradient (obtained through vehicle testing for the vehicle with nominal loading) $\Delta\alpha$ is the allowed variation of the roll gradient, $\underline{\beta}$ and $\overline{\beta}$ are the respective lower and upper bounds of the roll acceleration coefficient, which can be obtained as $$\underline{\beta}=\beta_0-\Delta\beta$$

$$\overline{\beta}=\beta_0+\Delta\beta \qquad (21)$$

and $\beta_0$ is the nominal value of the roll acceleration coefficient (for vehicle with nominal loading), $\Delta\beta$ is the allowed variation of the roll acceleration coefficient. If the second CLS method is used, the roll gradient $\alpha$ and the roll acceleration coefficient $\beta$ can be calculated in block 256 through the following iterative algorithm. First, a 2 by 2 matrix variable $V_{s+1}$ at the (s+1)th conditional time instant is calculated from its past value $V_s$ and the calculated filtered values of $X_k$ and $Y_K$ as in the following $$\text{if } (|\dot{\delta}_w| \geq \delta_{wvmin} \text{ \& level ground} \qquad (22)$$
$$\quad \text{\& no wheel lifting}$$
$$\quad \text{\& } s \leq N)$$
$$\{$$
$$\text{if } (s = 0)$$
$$\left\{ V_0 = \begin{bmatrix} v_0 & 0 \\ 0 & v_0 \end{bmatrix} ;\right\}$$

$$V_{s+1} = V_s - g \frac{V_s \begin{bmatrix} X_k^2 & -X_k Y_k \\ -X_k Y_k & Y_k^2 \end{bmatrix} V_s}{1 + \gamma [X_k - Y_k] V_s [X_k - Y_k]^T} ;$$

$$\}$$

where g, $\gamma$ and $v_0$ are three positive numbers, and the time instant k denotes the regular time instant and the time instant s is the conditional time instant. Equation (22) is also called the covariance resetting in the normalized least square algorithm.

The roll gradient and the roll acceleration coefficient are calculated using the 2 by 2 matrix $V_s$, and the calculated filtered values $X_k$, $Y_k$ and $U_k$ as in the following $$\text{if } (|\dot{\delta}_w| \geq \delta_{wvmin} \text{ \& level ground} \qquad (23)$$
$$\quad \text{\& no wheel lifting}$$
$$\quad \text{\& } s \leq N)$$
$$\{$$
$$\begin{bmatrix} \alpha_{s+1} \\ \beta_{s+1} \end{bmatrix} = \begin{bmatrix} \alpha_s \\ \beta_s \end{bmatrix} - g \frac{S_s [X_k - Y_k]^T U_k}{1 + \gamma [X_k - Y_k] S_s [X_k - Y_k]^T} ;$$
$$s = s + 1;$$
$$\}$$

The calculated values are also limited to within their feasible sets as in the following $$\alpha_{s+1} = \text{sat}(\alpha_{s+1}, \alpha_0 - \Delta\alpha, \alpha_0 + \Delta\alpha)$$

$$\beta_{s+1} = \text{sat}(\alpha_{s+1}, \beta_0 - \Delta\beta, \beta_0 + \Delta\beta) \qquad (24)$$

Notice that during the time instant where the conditions for (22) and (23) do not hold, the computations are frozen to the last values. That is if the following conditions are not true at a time instant k $$\{ |\dot{\delta}_w| \geq \delta_{wvmin} \text{ \& level ground} \qquad (25)$$
$$\quad \text{\& no wheel lifting}$$
$$\quad \text{\& } s \leq N \quad )$$

then computation in (2), (23) and (24) are not conducted, and the involved variables will keep the values for the last conditional sample s $$V_k = V_s;$$

$$\alpha_k = \alpha_s;$$

$$\beta_k = \beta_s. \qquad (26)$$

From the calculated roll gradient and the roll acceleration coefficient, the vehicle loading and its distance to the center of gravity of the vehicle body in the vertical direction can be determined in the following in step 122.

From FIG. 4, $M_s$ is the vehicle body mass and the height of the center of gravity $C_0$ of the car body is denoted as h which is measured in the vertical direction with respect to the vehicle floor. A loading of mass $\Delta M$ is added to the vehicle. The distance between the center of gravity of this mass relative to the vehicle floor is denoted as H. The center of gravity C of the vehicle body is likely to change due to the added mass $\Delta M$. The distance between $C_0$ and C is denoted as $\Delta H$. Then $\Delta H$ must satisfy the following relationship $$\Delta H = \frac{\Delta M}{M_s + \Delta M}(H - h) \qquad (27)$$

that is, the unknown $\Delta H$ can be readily obtained from the added mass $\Delta M$, the height of the added mass H, the center of gravity height h of the vehicle body and the vehicle mass $M_s$ prior to the addition of the mass $\Delta M$.

The total roll inertial momentum of the vehicle body with respect to the final center of gravity C can be expressed as $$I_{xc} = I_{xc}^M + I_{xc}^{\Delta M} \qquad (28)$$

where $$I_{xc}^M = I_{xc0} - M_s \Delta H^2$$

$$I_{xc}^{\Delta M} = \Delta M (H - h - \Delta H)^2 \qquad (29)$$

By inserting equation (27) into equation (29), equation (28) can be expressed as the following $$I_{xc} = I_{xc0} + \frac{M_s \Delta M (H - h)^2}{M_s + \Delta M} \qquad (30)$$

The nominal roll gradient and the roll acceleration coefficient is $\alpha_0$ and $\beta_0$. Then $$\alpha_0 = \frac{M_s h}{K_{roll}} \qquad (31)$$

$$\beta_0 = \frac{I_x}{K_{roll}}$$

where $K_{roll}$ denotes the roll stiffness due to suspension and anti-roll bar. Using those nominal values and the calculated values α and β, the loading mass and the loading distance satisfy the following $$\Delta MH = K_{roll}(\alpha - \alpha_0) = A \quad (32)$$

$$\frac{\Delta MM_s(H-h)^2}{M_s + \Delta M} = K_{roll}(\beta - \beta_0) = B$$

From the relationship in equation (32), the following estimations may be determined $$\begin{cases} H = h + \dfrac{B}{2A} + \sqrt{\dfrac{1}{4}\left(\dfrac{B}{A}\right)^2 + h\left(\dfrac{B}{A}\right) + \left(\dfrac{B}{M_s}\right)^2} \\ \Delta M = \dfrac{\alpha}{h + \dfrac{B}{2\alpha} + \sqrt{\dfrac{1}{4}\left(\dfrac{B}{A}\right)^2 + h\left(\dfrac{B}{A}\right) + \left(\dfrac{B}{M_s}\right)^2}} \end{cases} \quad (33)$$

In step 124, the height H of the added mass (ΔM) from the vehicle floor based on the first equation of (33) is determined.

In step 126, the added mass ΔM is determined based on the second equation of (33) by using the calculated height H of the added mass.

In step 128, a safety system such as a roll stability control system is controlled in response to the added mass and the height of the added mass. The safety system may also be controlled directly from the roll gradient and roll rate parameter, both of which may be adaptive. The safety system may also include the roll acceleration coefficient, which may also be adaptive as a factor in addition to the adaptive roll gradient and adaptive roll rate parameter. A vehicle roll angle compensation term may be determined such as that shown above. The vehicle roll angle compensation term may sensitize the roll angle computation for earlier deployments. The amount of roll compensation will depend on the particular vehicle and the characteristics of such things as the suspension and configuration of the vehicle. A roll stability control gain/threshold compensation term may also be generated. The threshold may be changed to allow earlier deployment if an added mass at a predetermined height is determined in steps 124 and 126. The amount of compensation will likely be determined experimentally based on the vehicle configuration.

Thus, as can be seen, the roll signal for control may be adjusted according to the vehicle loading and its height. On the other hand if the vehicle has a significant amount of loading, i.e., the calculated loading exceeds a threshold $L_{max}$ $$\Delta M \geq L_{max} \quad (34)$$

and at the same time the height of the mass exceeds another threshold $H_{max}$ $$H \geq H_{max} \quad (35)$$

then in addition to the adjusted computation of roll signal for control (through the adjustment of the chassis roll angle using the new roll gradient and roll acceleration coefficient), all the gains for the feedback control used for commanding the actuators are set to a set of values $G_{RLMAX}$ tuned for larger roof loadings, or adaptively adjusted in high values based on the amount of ΔM. In this way, when the vehicle has double wheel lift, the proper amount of actuation will be requested so the vehicle achieves robust roll stability control function during rollover event involving vehicles with large roof loadings.

If the vehicle has a significant loading, i.e., $\Delta M \geq L_{max}$, but the loading is a floor loading, that is, the height of the loading is smaller than a lower threshold $H_{min}$ $$H \leq H_{min} \quad (36)$$

all the gains for the feedback control used for commanding the actuators are set to a set of values $G_{FLMAX}$ tuned for larger floor loadings.

If the vehicle has a significant loading, i.e., $\Delta M \geq L_{max}$, but the loading height is between the roof and floor, i.e., H is between a lower threshold $H_{min}$ (possibly zero) and the higher threshold $H_{max}$ $$H_{min} \leq H \leq H_{max} \quad (37)$$

all the gains for the feedback control used for commanding the actuators are set to the following values adjusted based on the detected loading height as in the following $$G_H = G_{FLMAX} + \frac{H - H_{min}}{H_{max} - H_{min}}(G_{RLMAX} - G_{FLMAX}) \quad (38)$$

If the vehicle has a roof loading which is below the maximum allowed roof loading $L_{max}$ but above the lower bound of a valid roof loading $L_{min}$, i.e., $$L_{min} \leq \Delta M \leq L_{max} \quad (39)$$

Assume all the nominal gains for feedback (for the vehicle with nominal loading) are denoted as $G_{nom}$, then the control gains will be adjusted based on the detected roof loading as in the following $$G_{\Delta M} = G_{nom} + \frac{\Delta M - L_{min}}{L_{max} - L_{min}}(G_{RLMAX} - G_{nom}) \quad (40)$$

The roll gradient itself can also be directly used to adjust control gains. If the vehicle has a significant increase of roll gradient, i.e., $\alpha \geq \alpha_{min}$, then all the gains for the feedback control used for commanding the actuators are set to the following values adjusted based on the detected roll gradient as in the following $$G_\alpha = G_{\alpha MIN} + \frac{\alpha - \alpha_{min}}{\alpha_{max} - \alpha_{min}}(G_{\alpha MAX} - G_{\alpha MAX}) \quad (41)$$

where $\alpha_{min}$ is the roll gradient corresponding to a vehicle without roof loading and $\alpha_{max}$ is the roll gradient corresponding to the vehicle with maximum roof loading allowed.

Notice that the control gain adjustments other than the above listed linear interpolation methods are possible. Also, notice that the dead-bands and thresholds used in roll stability feedback control can also be similarly adjusted based on the loading height H and/or the loading ΔM, or the roll gradient, or the roll moment of inertia calculated as in (30).

Combining those control gain, dead-band and threshold adjustments with the quantitative roll angle (for example, the chassis roll) adjustment, a robust roll stability control function can be achieved.

Notice that based on the afore-mentioned computation of the added mass and its vertical from the vehicle floor, the roll moment of inertia of the vehicle body can be readily calculated as in (30). Alternatively, the roll moment of inertia $I_{xx}$ can be determined directly by using the equation $$M_x a_y h_{cg} - K_{roll} \theta_{xr} - D_{roll} \dot{\theta}_{xr} = I_{xx} \dot{\omega}_x \quad (42)$$

where $M_s$ is vehicle mass, $a_y$ is the measured lateral acceleration, $h_{cg}$ is the center of mass height above the roll center, $K_{roll}$ is the roll stiffness of the suspension, $\theta_{xr}$ is the relative roll of the body with respect to the wheels (or ground), $D_{roll}$ is the roll damping of the suspension, $\dot{\theta}_{xr}$ is the relative roll velocity and $\dot{\omega}_x$ the roll acceleration (obtained by differentiating the roll rate obtained from the roll rate sensor), and $I_{xx}$ is the roll inertia, in kg-m$^2$.

When $a_y$ and $\theta_{xr}$ are zero but $\dot{\theta}_{xr}$ and $\dot{\omega}_x$ are non-zero, then $$I_{xx} = -D_{roll} \dot{\theta}_{xr} / \dot{\omega} \quad (43)$$

Or, when $\theta_{xr}$ and $\dot{\theta}_{xr}$ are zero and the mass, $M_x$ is determined by another means, $$I_{xx} = M_s a_y h_{cg} / \dot{\omega}_x \quad (44)$$

Alternatively, the roll response of the vehicle, obtained from the roll rate sensor, can be analyzed in the frequency domain to determine roll gradient and roll acceleration coefficient:

$\omega_d$=the damped natural frequency of the roll motion of the vehicle (Hz)

$\omega_n$=the undamped natural frequency of the roll motion of the vehicle (Hz)

$\zeta$=the damping ratio of the roll motion of the vehicle (unitless)

Taking the Laplace transform of $$\theta_{xr} + \frac{D_{roll}}{K_{roll}} \dot{\theta}_{xr} = \frac{M_s h_{cg}}{K_{roll}} a_y - \frac{I_{xx}}{K_{roll}} \dot{\omega}_x \quad (45)$$

and rearranging yields the following by considering $\dot{\omega}_x \approx \ddot{\theta}_{xr}$ when the vehicle does not have large pitch motion or the vehicle does not have large yaw rate:

$$\frac{\Theta_{xr}(s)}{A_y(s)} = \frac{1}{\frac{I_{xx}}{M_s h_{cg}} s^2 + \frac{D_{roll}}{m_s h_{cgs}} s + \frac{K_{roll}}{m_s h_{cgs}}} \quad (46)$$

$$= \left(\frac{M_s h_{cg}}{K_{roll}}\right) \frac{1}{\frac{I_{xx}}{K_{roll}} s^2 + \frac{D_{roll}}{K_{roll}} s + 1}$$

where $\Theta_{xr}(s)$ and $A_y(s)$ are the Laplace transform of the $\theta_{xr}$ and $a_y$, respectively.

Using a digital fast Fourier transform to construct a frequency response function and determine the magnitude of $$\frac{\Theta_{xr}(s)}{A_y(s)}$$

with respect to frequency, the roll gradient is equal to the DC gain (Equation 46 evaluated at s=0).

The peak of the magnitude of the frequency response function will occur at the damped natural frequency, $$\omega_d = \omega_n \sqrt{1-\zeta^2} \quad (47)$$

where $\omega_n$ is the undamped natural frequency and $\zeta$ is the damping ratio. (Alternatively, the damped natural frequency can be determined from "impulse-like" inputs into the suspension (hitting a bump in the road or a pot-hole), and determining the frequency of the roll oscillations). From (45), we have $$\omega_n = \sqrt{\frac{K_{roll}}{I_{xx}}} \Rightarrow \frac{I_{xx}}{K_{Roll}} = \frac{1}{\omega_n^2} = -\beta \quad (48)$$

$$\zeta = \frac{\omega_n D_{roll}}{2 K_{roll}} \quad (49)$$

Substituting Equation (49) into Equation (47) gives $$\omega_d = \omega_n \sqrt{1 - \frac{\omega_n D_{roll}^2}{2 K_{roll}}} \quad (50)$$

Equation (50) can be solved for $\omega_n$, which can in turn be used to evaluate Equation (48) and solve for the roll acceleration coefficient $\beta$.

Another way to determine roll inertia is to use an indirect empirical approach. First, a mass is determined, then the inertia may be correlated to mass. That is, a first estimate mass is determined via a method such as that described in Invention Disclosure (203-0482) filed as U.S. patent application Ser. No. 10/849,590, the disclosure of which is incorporated by reference herein, or another method. Then the inertia may be obtained per various methods explained below:

a. Assume inertia changes as mass changes from its base values, $M_{s\_base}$ to the current value, $M_{s\_current}$ as:

$$I_{xx\_total} = I_{xx\_base} + h_2(M_{s\_current} - M_{s\_base}) \quad (51)$$

where $h_2$ is assumed to be a constant. Based on testing for a vehicle loaded several ways, an average may then be used.

b. Correlate roll inertia, $I_{xx}$, to vehicle mass; e.g., via testing using a vehicle inertial measurement facility to get roll inertia, the mass for various loading conditions and roof loads may be correlated. This is based on the premise that you can only load an SUV so many ways (e.g., mass above curb loading must be placed in vehicle seats and/or on the roof rack). Again, the vehicle mass may be determined via a method described in U.S. patent application Ser. No. 10/849,590 or another method, then use the roll inertia, $I_{xx}$, corresponding to that mass obtained from testing.

The currently estimated mass or roll inertia estimate can be used several ways in the RSC algorithm, including:

Improved state estimation: Since mass and inertia values are used in the roll, pitch, and yaw angle state estimates, values accurately reflecting the actual vehicle will improve the accuracy, improve RSC control, and reduce the occurrence of false interventions.

Modified thresholds for activation: For example, a fully loaded vehicle can be less stable in roll. Hence, tighter thresholds on roll angle and roll rate, for example, can be used. This will increase the level of RSC control for the same level of roll angle and velocity for the loaded vehicle.

c. Increased gains for the RSC PID and/or Transition controllers.

d. Less stringent entry conditions for PID or Transition control intervention.

e. Any combination of the above.

Various vehicle dynamic and safety restraint characteristics may be adjusted upon the detection, determination, and evaluation of the loading or loading condition of a vehicle. The stated vehicle characteristics may be adjusted for any and all driving conditions and vehicle operating conditions. The vehicle characteristics may be adjusted for rollover and non-rollover events and situations. Several vehicle characteristics are described below in association with multiple embodiments of the present invention. The below described embodiments may be utilized alone, in cooperation with each other, or in any combination or order. Also, although the below embodiments are primarily described with respect to roof loading, they may be modified and utilized for other vehicle loading, such as interior vehicle loading, trunk loading, etc.

Throttle Adjustment

Upon the detection of a vehicle being lightly loaded, such as when there is little to no roof loading and/or when there is a single occupant and/or when there is little to no trunk loading, the throttle sensitivity and profile may be adjusted. The throttle sensitivity refers to the amount of throttle response per throttle adjustment. For example, the throttle response may be adjusted differently for the same amount of throttle displacement. The throttle profile refers to a throttle curve representing the relationship between throttle input and throttle response. In an example embodiment, the throttle adjustment is set such that the vehicle acceleration is not overly sensitive or is less sensitive in comparison with a vehicle that is heavily loaded. Upon the detection of the vehicle being heavily loaded, the throttle profile is adjusted to increase sensitivity. The adjustment is achieved such that the acceleration of the vehicle is more responsive in comparison to the vehicle without such loading.

Steering/Over-Steer/Under-Steer Characteristic Adjustment

When a vehicle has large roof loading, which is positioned close to the rear end of the vehicle, the vehicle tends to exhibit more over-steer than the same vehicle without such loading. Upon the detection of such loading, the operation of an electronic power steering (EPS) system may be adjusted to compensate for the experienced over-steer.

When a vehicle has large roof loading, which is positioned close to the front end of the vehicle, the vehicle tends to exhibit more under-steer than the same vehicle without such loading. Upon the detection of such loading, the operation of an electronic power steering (EPS) system may be adjusted to compensate for the under-steer.

When a vehicle has large roof loading, which is positioned close to the rear end of the vehicle, the vehicle tends to exhibit more over-steer than the same vehicle without such loading. Upon the detection of such loading, the operation of an active front steering system (AFS) may be adjusted to compensate for the over-steer.

When a vehicle has large roof loading, which is positioned close to the front end of the vehicle, the vehicle tends to exhibit more under-steer than the same vehicle without such loading. Upon the detection of such loading, the operation of an active front steering system (AFS) may be adjusted to compensate for the under-steer.

When a vehicle has large roof loading, which is positioned close to the rear end of the vehicle, the vehicle tends to exhibit more over-steer than the same vehicle without such loading. Upon the detection of such loading, the damping of the front suspension dampers of the vehicle is increased and the damping of the rear suspension dampers is decreased to compensate for the over-steer.

When a vehicle has large roof loading, which is positioned close to the front end of the vehicle, the vehicle exhibits more under-steer than the same vehicle without such loading. Upon the detection of such loading, the damping of the rear suspension dampers of the vehicle is increased and the damping of the front suspension dampers is decreased to compensate for the vehicle under-steer.

Vehicle Roll Motion Adjustment

When a vehicle has large roof loading, the vehicle tends to exhibit larger roll motions during dynamic maneuvers than the same vehicle without such roof loading. Upon the detection of such loading and when the vehicle is driven less aggressively, an EPS steering booster curve or associated profile may be adjusted to reduce the experienced driver head tossing in the roll direction. During aggressive maneuvers, the EPS booster curve is further reduced such that the roll motion of the vehicle is reduced for the same amount of large steering input, upon the detection of the roof loading.

Upon the detection of a roof loading of a vehicle, electronically controlled suspension dampers may be adjusted to adjust the vehicle roll damping characteristics. This occurs to reduce the increased vehicle roll motion due to the roof loading during vehicle cornering.

Vehicle Pitch Motion Adjustment

During braking, a vehicle with large roof loading experiences increased body-pitching velocity than the vehicle without such roof loading. Hence upon the detection of roof loading, an electronic brake distribution function with ABS may be adjusted such that the brake distribution increases more towards the rear axle. This reduces the vehicle body-pitching velocity, which further reduces driver head tossing in the pitch direction.

Upon the detection of roof loading, electronically controlled suspension dampers may be used to adjust the pitch damping of the vehicle such that the increased vehicle pitch motion is reduced during vehicle braking.

Safety Restraint Demployment Adjustment

When a roof of a vehicle is loaded, the acceleration, braking, steering, handling, response, and performance characteristics of the vehicle are different than without such loading. AS such, safety restraints and the deployment thereof, including deployment rates, deployment profiles, and timing, may be adjusted to compensate for such characteristical changes. For example, if a vehicle has large roof loading, its c.g. height increases. Hence when it is hit by another vehicle or its tire hits a tripped mechanism, the vertical distance between the impact spot and the vehicle's c.g. is likely to be large than the vehicle without large roof loading. Hence the vehicle will likely to rollover more than the vehicle without roof loading. For this reason, upon the detection of the large roof loading, the threshold for activating rollover curtain is adjusted.

Integrated Adjustment

Upon the detection of vehicle roof loading, the afore-mentioned individual adjustments through individual actuators may be arbitrated or prioritized among the various actuators so as to achieve a coordinated overall adjustment of the vehicle characteristics.

While particular embodiments of the invention have been shown and described, numerous variations and alternate embodiments will occur to those skilled in the art. Accordingly, it is intended that the invention be limited only in terms of the appended claims.

What is claimed is:

1. A control system for an automotive vehicle having an associated center of gravity, said control system comprising:
   at least one sensor for generating a sensor signal; and
   a controller coupled to each said sensor and having an associated loading detector that detects and determines added mass onboard said automotive vehicle in response to each said sensor signal,
   said controller determines a change in said associated center of gravity of said automotive vehicle as caused by said added mass and accordingly adjusts a roll stability control gain or threshold value for an onboard roll-stability control (RSC) system in response to said added mass and said change in said associated center of gravity.

2. A control system as in claim 1, wherein said controller determines said added mass and accordingly adjusts at least one vehicle characteristic in response to a normal non-rollover driving condition.

3. A control system for an automotive vehicle having an associated center of gravity, said control system comprising:
   at least one sensor for generating a sensor signal; and
   a controller coupled to each said sensor and having an associated loading detector to detect and determine added mass onboard said automotive vehicle and also the height of said added mass onboard said automotive vehicle in response to each said sensor signal,
   said controller determines a change in said associated center of gravity of said automotive vehicle as caused by said added mass and said height of said added mass and accordingly adjusts a profile of at least one vehicle system characteristic in response to said added mass, said height of said added mass, and said change in said associated center of gravity.

4. A control system as in claim 3, wherein said controller adjusts a plurality of profiles associated with a plurality of vehicle characteristics.

* * * * *